US012789493B2

(12) United States Patent
Vianello et al.

(10) Patent No.: US 12,789,493 B2
(45) Date of Patent: Nov. 10, 2026

(54) PROCESS FOR AUTOMATICALLY CORRECTING DEFECTS ON SELF-ADHESIVE LABELS ON A CONTINUOUS BAND

(71) Applicant: GRAPHIMECC GROUP S.R.L, Verona (IT)

(72) Inventors: Andrea Ranzato Vianello, Verona (IT); Vincenzo Roncolato, Verona (IT)

(73) Assignee: GRAPHIMECC GROUP S.R.L, Verona (IT)

( * ) Notice: Subject to any disclaimer, the term of this patent is extended or adjusted under 35 U.S.C. 154(b) by 56 days.

(21) Appl. No.: 17/909,958

(22) PCT Filed: Mar. 9, 2021

(86) PCT No.: PCT/IB2021/051929
§ 371 (c)(1),
(2) Date: Sep. 7, 2022

(87) PCT Pub. No.: WO2021/181252
PCT Pub. Date: Sep. 16, 2021

(65) Prior Publication Data
US 2023/0347615 A1 Nov. 2, 2023

(30) Foreign Application Priority Data
Mar. 10, 2020 (IT) ........................ 102020000005065

(51) Int. Cl.
*B31D 1/02* (2006.01)

(52) U.S. Cl.
CPC ............ *B31D 1/021* (2013.01); *B31D 1/028* (2013.01); *B31D 2201/02* (2013.01)

(58) Field of Classification Search
CPC ..... B31D 1/021; B31D 1/028; B31D 2201/02
See application file for complete search history.

(56) References Cited

U.S. PATENT DOCUMENTS 4,661,189 A * 4/1987 Voy ........................ B31D 1/021 428/40.1
2012/0241077 A1 * 9/2012 Hada ..................... B32B 37/025 156/364

FOREIGN PATENT DOCUMENTS

EP 1698999 * 9/2006 ............. G06K 17/00

* cited by examiner

*Primary Examiner* — George R Koch
*Assistant Examiner* — Christopher C Caillouet
(74) *Attorney, Agent, or Firm* — Rutan & Tucker, LLP

(57) ABSTRACT

A process for automatically correcting defects and non-compliances in self-adhesive labels or the like on a continuous band, comprising the steps of: advancing the continuous band (10) so as to expose the self-adhesive labels to inspection means (12); if these inspection means (12) detect a non-compliance in at least one self-adhesive label, imparting a bend to the continuous band (10) as to cause detachment of the defective label from said main continuous band (10); replacing this defective label with a replacement label (11); and rewinding the continuous band (10) in a direction opposite to the direction of travel until the replacement label (11) is upstream of the inspection means (12).

10 Claims, 2 Drawing Sheets

PROCESS FOR AUTOMATICALLY CORRECTING DEFECTS ON SELF-ADHESIVE LABELS ON A CONTINUOUS BAND

TECHNICAL FIELD

The present invention generally lies within the field of procedures for monitoring quality; in particular, the invention relates to a process for automatically detecting and correcting non-compliances in self-adhesive labels arranged on a continuous band.

PRIOR ART

Machines for continuously overprinting labels on a band are known, which incorporate devices that are intended for detecting any defects and non-compliances and are adapted to identify and signal the labels which have such defects.

In the prior art, when a defect is detected, the continuous band is stopped from circulating in order to allow an operator to remove a portion of the band that contains the defective label. The ends of the band, separated from the cut-out portion, are then spliced to one another in order to restore the continuity of the band, which is then advanced again.

An example of a solution of this kind is known from patent application PC 2002 A 000031.

However, such a process for removing defects has numerous drawbacks, for example with regard to the fact that a lot of waste is produced, the presence of joints along the band (at the parts removed by the operator), which joints are a source of criticality in the subsequent labeling processes, and the long process times caused by the need for the operator to manually remove the defective labels and splice the cut ends of the band.

These limitations, understandably, make the process of inspecting and correcting defects on the continuous band inefficient, in particular when quality control is to be applied to a large number of labels.

SUMMARY OF THE INVENTION

The object of this invention is to overcome the aforementioned problems.

In order to achieve this result, a process according to the present invention makes it possible to automatically detect and correct any defects and/or non-compliances on a plurality of adhesive labels which are transported by a continuous band.

In particular, the process comprises the step of presenting the adhesive labels to inspection means (of the optical, radiofrequency, etc. type) which verify whether the labels (and, in particular, the information that they bear overprinted or coded thereon) conform to requirements and do not have any defects.

If a defect is detected on a label, a curve is imparted to the band downstream of the inspection means so as to cause said label to detach from the band.

The band is then rewound until the portion of the band on which the defective label was present has been brought upstream of the inspection means.

In place of the defective label, a replacement label is affixed to the corresponding space on the band, which replacement label may already carry the information that originally should have been present on the defective label or may be a blank label on which such information is yet to be added.

The step of applying the replacement label may be carried out downstream of the inspection means (in which case the replacement label will be returned upstream of said inspection means by rewinding the band), or upstream of said inspection means (in which case there will be an empty space on the rewound band, and the replacement label will be applied to the band when this space has been brought upstream of the inspection means). The replacement label is then once again exposed to the inspection means, in order to verify its compliance and the absence of defects.

The step of overprinting or coding information on the original and/or replacement labels may be provided; in the latter case, this step may be carried out upstream or downstream of the inspection means.

In this way, it is possible to implement the process according to the invention on machines with or without a printing and/or coding station, so as to extend the scope of application of the process to machines fed with labels that have not previously been overprinted or coded or to machines fed with labels that have already been overprinted or coded before entering the machine (for example when the labels are arranged on the band in a random sequence).

It is thus possible to obtain total automation of the monitoring and correction process, with the advantage of making the process significantly faster and more reliable than the solutions set out in the prior art, which is essential, for example, in the field of security printing (for example of pharmaceutical or state stamps), which requires the total absence of errors or defects, the absence of splices and no need for any action on the part of the operator.

The aforesaid and other aims and advantages are achieved, according to one aspect of the invention, by a process for automatically detecting and correcting non-compliances in self-adhesive labels arranged on a continuous band having the features defined in claim 1. Preferred embodiments of the invention are defined in the dependent claims.

BRIEF DESCRIPTION OF THE DRAWINGS

The functional and structural features of some preferred embodiments of a process according to the invention will now be described. Reference is made to the appended drawings, in which.

DETAILED DESCRIPTION

Figure 1:
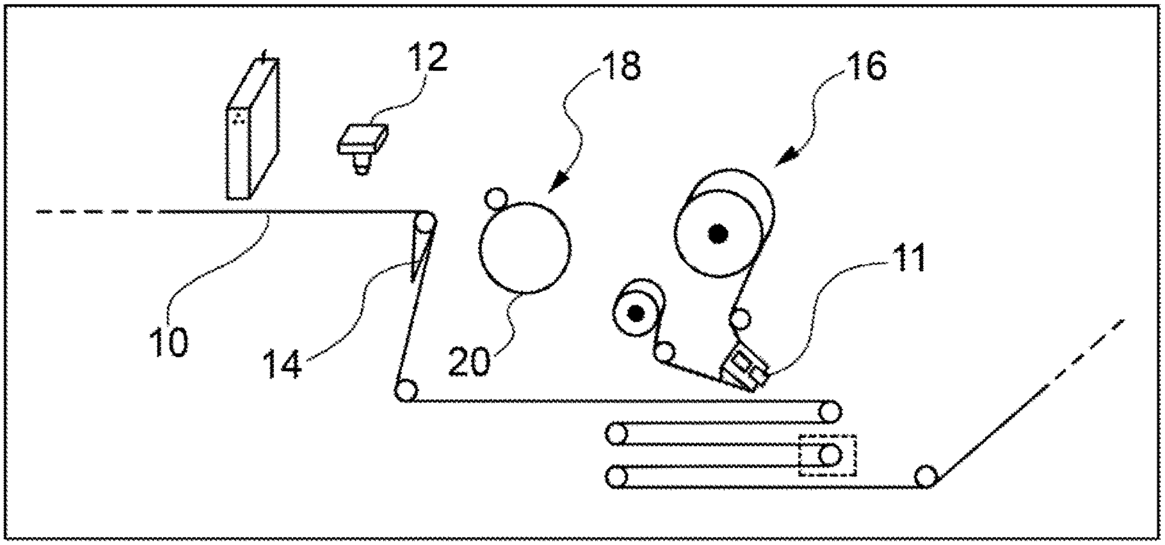
FIGS. 1 and 2 are schematic views of a process according to one embodiment of the invention, referring respectively to a configuration in which non-compliances have not been detected on the labels fed to the machine and a configuration in which a non-compliance has been detected on at least one label.

Before describing a plurality of embodiments of the invention in detail, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting.

Referring by way of example to FIG. 1, a process for automatically correcting defects and/or non-compliances in self-adhesive labels or the like on a continuous band comprises the step of providing a main continuous band 10 on which a plurality of self-adhesive labels is attached, juxtaposed in a direction of travel of the main continuous band 10 (from left to right in the figures). The band advantageously unwinds from a feed spool, and rewinds onto a collection spool (not shown).

The labels are suitably adapted to carry information, for example in the form of overwritten data (such as alphanumeric sequences, bar codes, etc. which may be deciphered using optical instruments) or coded or stored data (as in the case of RFID tags), etc.

Inspection means 12 are provided which are adapted to detect any non-compliance in the self-adhesive labels (for example if the format and/or content of the information on the label does not conform to expectations). These inspection means 12 may be designed to operate optically (for example by means of CCD cameras) or at radiofrequency (for example if the labels to be examined are RFID labels), etc.

The process then comprises the step of advancing the main continuous band 10 so as to expose the self-adhesive labels to the inspection means 12 (for example by arranging the labels so as to face the camera or other inspection means, since the latter inspects the content thereof).

Therefore, if the inspection means 12 detect a non-compliance in at least one self-adhesive label, a bend is imparted to the main continuous band 10 downstream of the inspection means 12, thereby giving the main continuous band 10 a radius of curvature so as to cause an (at least partial) detachment of the at least one non-compliant self-adhesive label from said main continuous band 10. In other words, a sufficiently large curve is imparted to the band 10 (by ensuring that the band 10 follows a sufficiently sharp turn) as to cause (advantageously spontaneous) detachment between the band 10 and the defective label ("film removal"). In the opposite case (i.e. when defects have not been detected), the band 10 continues to circulate in the direction of travel, and the labels remain attached to said band 10.

According to a preferred embodiment, this detachment may be obtained by switching a cam 14, on which the main continuous band 10 is slidable, from a first operating position, in which this cam 14 exposes to the main continuous band 10 a first curved surface having a first radius of curvature configured in such a way as to prevent the detachment of the self-adhesive labels from the main continuous band 10, to a second operating position, in which the cam 14 exposes to the main continuous band 10 a second curved surface having a second radius of curvature smaller than the first radius of curvature and configured in such a way as to cause the detachment of the overprinted labels from the main continuous band 10. In this latter case, the main continuous band 10 is therefore forced to travel over the most pointed portion of the cam 14, thereby being deflected at such a curvature so as to cause spontaneous detachment of at least part of the defective label from the main continuous band 10.

Once detached from the band 10, the non-compliant self-adhesive label is removed, leaving a corresponding empty space on the main continuous band 10.

According to one embodiment, the step of removing the non-compliant self-adhesive label is carried out by providing an interlocking group 18 comprising a secondary support 20 (advantageously in turn configured as a continuous band, according to an embodiment which is not shown) arranged in proximity to the bending zone of the main continuous band 10, so that the adhesive labels which detach from the main continuous band 10 adhere to the secondary support 20. This secondary support 20 may in turn unwind from and rewind onto feed and collection spools, respectively, or may be formed by the external surface of a drum (as in the example shown), which drum is advantageously associated with a pressure roller which interacts with the drum in order to pinch the detached label off the band 10 and transport it in order to adhere it to the relative support surface.

The secondary support 20 may therefore have a portion that faces the main continuous band 10 in proximity to the cam 14 when the latter is in the second operating position, such that the advancement of the main continuous band 10 causes the (spontaneous or induced) transfer of the removed label from said main continuous band 10 to the secondary support 20.

In the space on the main continuous band 10 that is left empty by the removed non-compliant label, a replacement label 11 is subsequently applied, which replacement label may already bear the information that originally should have been present on the defective label or may be a blank label on which said information is yet to be added (in this case, a further step of overprinting or coding may be provided).

The main continuous band 10 is rewound in the direction opposite to the direction of travel, until the portion of the main continuous band 10 on which the at least one defective label was present is upstream of the inspection means 12. As will be seen in the following, according to two alternative embodiments of the invention, it is possible for this portion of the band 10 to be an empty portion (if the replacement label 11 is applied upstream of the inspection means 12) or to be occupied by the replacement label 11 (when said label is applied to the band 10 downstream of the inspection means 12, before the rewinding brings the portion of the band 10 on which the defective label was present upstream of the inspection means 12).

Once the replacement label 11 is upstream of the inspection means 12, the band 10 is once again made to circulate in the direction of travel, so as to expose the replacement label 11 (and the successive labels) to the inspection means 12.

According to one embodiment, the process comprises the step of overwriting and/or coding the original self-adhesive labels and/or the replacement labels 11, the latter with the content originally provided for the at least one adhesive label of which non-compliance has been detected. The step of overwriting and/or coding may be carried out by providing suitable printing and/or coding means (known per se, and not shown), which means are arranged upstream of the inspection means 12 (in order to apply the information to the original self-adhesive labels) or upstream or downstream of the inspection means 12 (in order to apply the information to the replacement labels 11).

Advantageously, the step of overwriting and/or coding the self-adhesive labels and/or the replacement labels 11 is carried out upstream of the inspection means.

The step of providing an auxiliary labeling unit 16 may be provided, which is adapted to apply replacement labels 11

(which are blank or already bear information) on the empty spaces left by the self-adhesive labels removed from the main continuous band 10 following the detection of a non-compliance. According to one embodiment, this auxiliary labeling unit 16 may comprise an auxiliary feed spool and an auxiliary collection spool, from and onto which an auxiliary continuous band unwinds and rewinds, respectively, and on which auxiliary band a plurality of replacement labels 11 are adhered. Advantageously, the replacement labels 11 may detach from the auxiliary continuous band by means of an auxiliary cam, in a manner similar to that shown with reference to the step of removing the defective labels from the main continuous band 10. The main continuous band 10 and the auxiliary band may suitably be arranged at a distance and angle from one another such that the replacement labels 11, detaching from the auxiliary band, spontaneously transfer into the corresponding spaces left empty on the main continuous band 10 by the removal of the defective labels.

Figure 2:
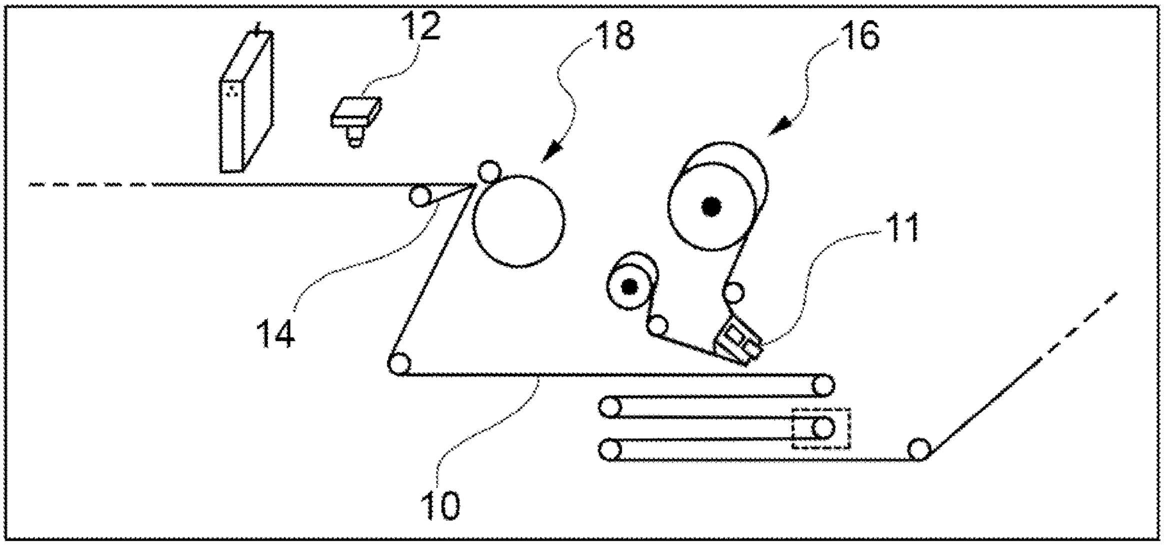

According to one embodiment (shown schematically in FIGS. 1 and 2), the auxiliary labeling unit 16 is arranged downstream of the inspection means 12.

Figure 3:
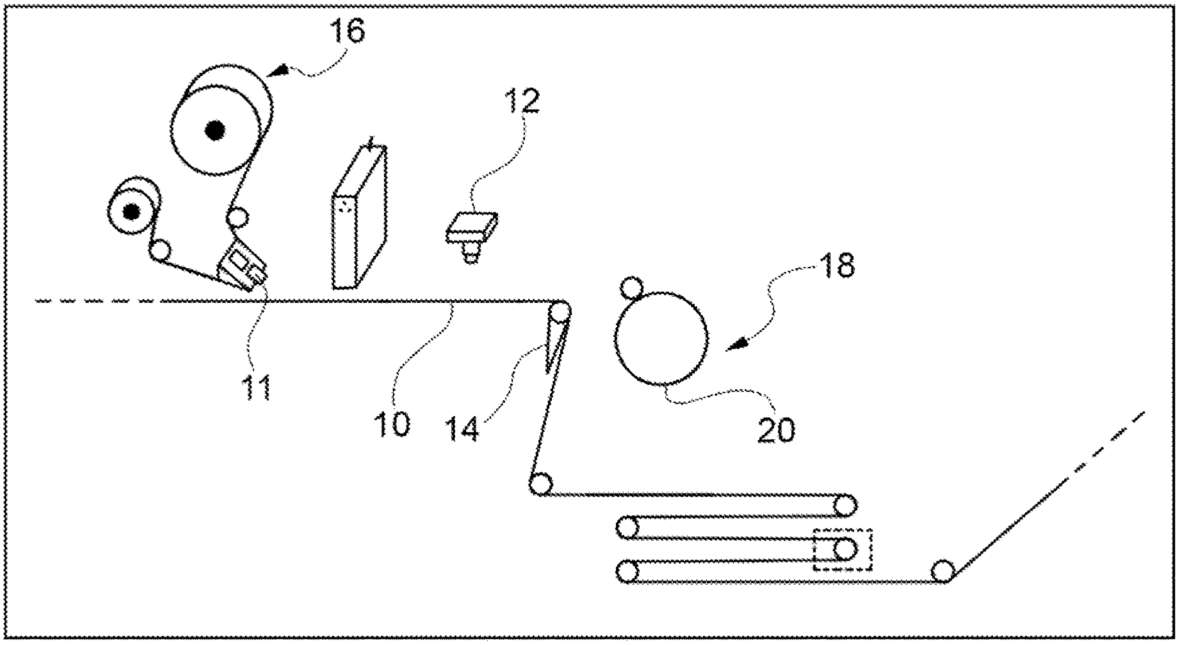
FIGS. 3 and 4 are schematic views of a process according to another embodiment of the invention, referring respectively to a configuration in which non-compliances have not been detected on the labels fed to the machine and a configuration in which a non-compliance has been detected on at least one label.
Figure 4:
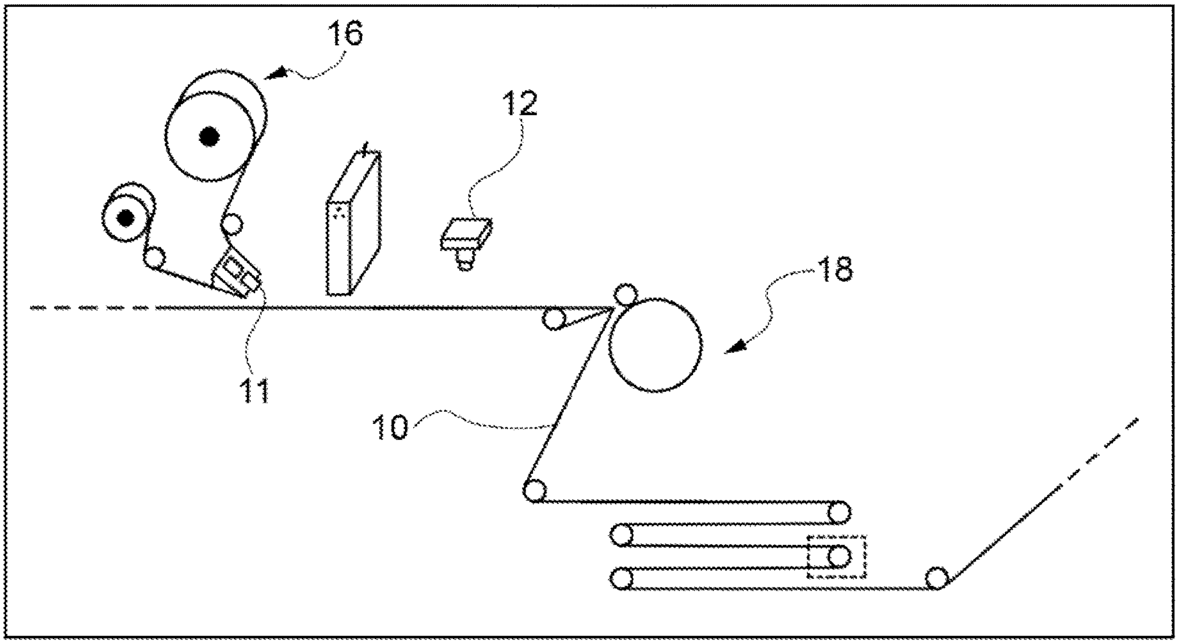

According to an alternative embodiment (shown schematically in FIGS. 3 and 4), the auxiliary labeling unit 16 is arranged upstream of the inspection means 12.

According to a preferred embodiment, the step of providing computer means adapted to control and coordinate the servomechanisms responsible for implementing one or more of the steps of the process described above is provided. This allows the process to be completely automated, without any intervention from an operator (and with consequent savings in time and an absence of splices).

Various aspects and embodiments of a process according to the invention have been described. It is understood that each embodiment may be combined with any other embodiment. Furthermore, the invention is not limited to the described embodiments, but may be varied within the scope defined by the appended claims.

The invention claimed is:

1. A method for automatically correcting defects or non-compliances in self-adhesive labels on a continuous band, comprising steps of:

a) providing a main continuous band, on which the self-adhesive labels, juxtaposed in a direction of travel of the main continuous band, are attached;

b) providing inspection means adapted to detect any non-compliance in the self-adhesive labels;

c) advancing the main continuous band so as to expose one or more of the self-adhesive labels to the inspection means;

d) if the inspection means detect a non-conformity in at least one self-adhesive label, imparting a bend to the main continuous band downstream of the inspection means, thereby giving the main continuous band a radius of curvature such as to cause an at least partial detachment of the at least one self-adhesive label from the main continuous band, wherein the bend is imparted by switching a cam from a first operating position to a second operating position, wherein the second operation position is configured to cause the at least partial detachment of the at least one self-adhesive label having the non-conformity from the main continuous band, and wherein the cam rotates about a first fixed point;

e) receiving, by an interlocking group, the at least one self-adhesive label having the non-conformity, wherein the interlocking group is comprised of an external drum and a pressure roller configured to pinch off the at least one self-adhesive label having the non-conformity, wherein the external drum and the pressure roller each maintain a fixed spacing relative to the first fixed point about which the cam rotates, and wherein the external drum rotates about a second fixed point and the pressure roller rotates about a third fixed point while pinching off the at least one self-adhesive label having the non-conformity;

f) removing the at least one self-adhesive label detached from the main continuous band, leaving a corresponding empty space on the main continuous band;

g) applying a replacement label on the main continuous band, in the empty space left by the at least one removed self-adhesive label, to replace the removed self-adhesive label; and h) rewinding the main continuous band in a direction opposite to the direction of travel, until the portion of the main continuous band corresponding to the at least one non-compliant self-adhesive label is upstream of the inspection means.

2. The method according to claim 1, further comprising: overwriting or coding the at least one self-adhesive label or the replacement label, wherein coding the at least one self-adhesive label or the replacement label is of content originally provided for the at least one self-adhesive label of which non-compliance has been detected.

3. The method according to claim 2, wherein the step of overwriting or coding of self-adhesive labels replacement labels is carried out upstream of the inspection means.

4. The method according to claim 1 further comprising: providing an auxiliary labeling unit, adapted to apply replacement labels on empty spaces left by the at least one removed self-adhesive label from the main continuous band.

5. The method according to claim 4, wherein the auxiliary labeling unit is arranged upstream of the inspection means.

6. The method according to claim 4, wherein the auxiliary labeling unit is arranged downstream of the inspection means.

7. The method according to claim 1, wherein step (g) is carried out upstream of step (e).

8. The method according to claim 1, wherein step (g) is carried out downstream of step (e).

9. The method according to claim 1, wherein step (f) is carried out by switching a cam, on which the main continuous band is slidable, from a first operating position, in which the cam exposes to the main continuous band a first curved surface having a first radius of curvature configured in such a way as to prevent detachment of overprinted labels from the main continuous band, to a second operating position, in which the cam exposes to the main continuous band a second curved surface having a second radius of curvature smaller than the first radius of curvature and configured in such a way as to cause the detachment of the overprinted labels from the main continuous band.

10. The method according to claim 1, further comprising: providing computer means, adapted to control and coordinate servomechanisms responsible for implementing the steps of the method.

* * * * *